US009061594B2

(12) United States Patent
Wesche et al.

(10) Patent No.: US 9,061,594 B2
(45) Date of Patent: Jun. 23, 2015

(54) PANTOGRAPH DAMAGE AND WEAR MONITORING SYSTEM

(75) Inventors: Darryl Wesche, Mackay (AU); Timothy John Watkins, Mackay (AU); Leonard George Chardborn Hamey, North Ryde (AU)

(73) Assignee: QR LIMITED, Queensland (AU)

( * ) Notice: Subject to any disclaimer, the term of this patent is extended or adjusted under 35 U.S.C. 154(b) by 870 days.

(21) Appl. No.: 12/671,871

(22) PCT Filed: Aug. 6, 2008

(86) PCT No.: PCT/AU2008/001135
§ 371 (c)(1),
(2), (4) Date: Sep. 7, 2010

(87) PCT Pub. No.: WO2009/018612
PCT Pub. Date: Feb. 12, 2009

(65) Prior Publication Data
US 2010/0322465 A1    Dec. 23, 2010

(30) Foreign Application Priority Data
Aug. 6, 2007    (AU) ............................... 2007904219

(51) Int. Cl.
*G06K 9/00*    (2006.01)
*H04N 7/18*    (2006.01)
*B60L 5/24*    (2006.01)
*G06T 7/00*    (2006.01)
*B60M 1/28*    (2006.01)

(52) U.S. Cl.
CPC ................ *B60L 5/24* (2013.01); *G06T 7/0004* (2013.01); *B60M 1/28* (2013.01); *B60L 2200/26* (2013.01)

(58) Field of Classification Search
None
See application file for complete search history.

(56) References Cited

U.S. PATENT DOCUMENTS

| 4,264,927 | A  | * | 4/1981 | Raymond et al. ............. 348/148 |
| 2004/0151379 | A1 | * | 8/2004 | Kim et al. ..................... 382/209 |
| 2006/0015233 | A1 | * | 1/2006 | Olsen et al. ..................... 701/50 |
| 2006/0087498 | A1 | * | 4/2006 | Evemy et al. ................. 345/204 |

(Continued)

FOREIGN PATENT DOCUMENTS

| JP | 05292601 | 11/1993 |
| JP | 08-079904 | 3/1996 |

(Continued)

OTHER PUBLICATIONS

Maly, T.; Schweinzer, H.; Rumpler, M.; "Advances in Train Monitoring by Networked Checkpoints"; Sep. 22-24, 2004; 2004 IEEE International Workshop on Factory Communication Systems, 2004. Proceedings.; 339-342.*

(Continued)

*Primary Examiner* — Christopher S Kelley
*Assistant Examiner* — Kaitlin A Retallick
(74) *Attorney, Agent, or Firm* — Steptoe & Johnson LLP

(57) ABSTRACT

A system for evaluating the condition of a pantograph, the system comprising: a track-side pantograph monitoring station that captures one or more images of a pantograph, while a locomotive comprising the pantograph is in normal service; a station management system that analyzes one or more images captured at the monitoring site and determines the condition of the pantograph; and a user interface that controls the system and presents the results of the analysis to the user. A user may control the track-side monitoring station and station management system remotely.

38 Claims, 10 Drawing Sheets

(56) References Cited

U.S. PATENT DOCUMENTS

| | | | |
|---|---|---|---|
| 2006/0200307 A1* | 9/2006 | Riess | 701/207 |
| 2006/0210117 A1* | 9/2006 | Chang et al. | 382/113 |
| 2007/0000744 A1* | 1/2007 | Craig et al. | 191/2 |
| 2007/0237398 A1* | 10/2007 | Chang et al. | 382/224 |
| 2007/0296949 A1* | 12/2007 | Blair | 356/3.07 |
| 2009/0320554 A1* | 12/2009 | Watabe et al. | 73/7 |

FOREIGN PATENT DOCUMENTS

| | | |
|---|---|---|
| JP | 08-168102 | 6/1996 |
| JP | 08-228338 | 9/1996 |
| JP | 2002-150271 | 5/2002 |
| JP | 2002 150271 | 5/2002 |
| JP | 2000-180128 | 6/2008 |
| WO | WO 2005044614 A1 * | 5/2005 ............... B60M 1/28 |
| WO | WO 2005/090903 | 9/2005 |

OTHER PUBLICATIONS

Maly, T.; Schweinzer, H. Rumpler, M.; "Advances in Train Monitoring by Networked Checkpoints"; Sep. 22-24, 2004; 2004 IEEE International Workshop on Factory Communication Systems, 2004. Proceedings.; 339-342.*

Office Action issued in corresponding CN Application No. 200880102082.3.

Japanese Office Action issued in JP Application No. 2010-519308.

European supplementary search report for European Application No. 08782885.1 dated May 14, 2013.

* cited by examiner (a)

(b)

(c)

| RESULTS | | | |
|---|---|---|---|
| Frames: | 12 | Source: | Camera |
| Area: | 0 | View: | Top |
| Width (Leading): | 0 | Type: | Y-Bar |
| Width (Trailing): | 0 | Diagnosis: | Damaged |

# PANTOGRAPH DAMAGE AND WEAR MONITORING SYSTEM

CLAIM OF PRIORITY

This application claims priority under 35 USC 371 to International Application No. PCT/AU2008/001135, filed on Aug. 6, 2008, which claims priority to Australian Application Serial No. 2007904219, filed Aug. 6, 2007, each of which is incorporated by reference in its entirety.

TECHNICAL FIELD

The invention described herein relates to locomotive pantographs. In particular, the invention is directed to an automated pantograph damage and wear monitoring system, although the scope of the invention is not necessarily limited thereto.

BACKGROUND ART

Most electrified trains utilise pantographs to transmit electricity from an overhead wire to the train. Pantographs of modern high speed, electrified trains comprise carbon current collectors. These carbon current collectors typically comprise a carbon block support and a carbon block that contacts the wire. The carbon block functions inter alia to minimise the wear on the overhead wire. A major problem with the carbon blocks is that they are susceptible to crack damage. Misalignment of electrical sectioning equipment, excessive arcing and constant friction can all cause significant damage to the carbon block. If not detected and repaired, such damage can cause dewirement and/or damage to the pantograph generally and therefore render a train inoperable. To detect damage to pantographs it is common practice for the operators of railways to conduct manual inspections at regular intervals. This process requires relocation of the train to be inspected to a service depot, electrical isolation of the overhead wires and access to the top of the train. The labour costs and operational down time associated with such an inspection process are clearly undesirable. A number of systems have been developed to circumvent the manual gauging of pantographs. GB1374972 and GB2107662 describe systems that measure pantograph damage in which tubes are placed within a cavity of a pantograph current collector. If sufficient damage is sustained by the pantograph, the tube ruptures causing a drop in system pressure. This loss is detected and the system automatically lowers the pantograph, thereby preventing further damage to the pantograph and/or the overhead wire. EP-A-0269307, DE-U-8803377.5 and EP-A-0525595 describe systems in which optical fibres are embedded near the wear surface of a pantograph current collector. Optical signals are transmitted in the fibres and if damage to a fibre results, the loss of the optical signal in that fibre indicates pantograph damage and/or wear. Another approach described in Engineering Integrity, Volume 19, March 2006, pp. 12-17 employs a laser assisted image processing technology to automatically detect pantograph carbon current collector wear.

While the systems described above are effective at monitoring pantograph damage and/or wear they suffer from the disadvantage that they are cost prohibitive. The system described in Engineering Integrity, Volume 19, March 2006, pp. 12-17 suffers from the added disadvantage that locomotives must be relocated to a designated monitoring station and therefore taken out of normal service. Moreover, the system can only guarantee accuracy of measurement if the locomotive is traveling less than 12 kilometers per hour (kph) at the monitoring station.

It is an aim of the invention to provide a cost-effective system that automatically monitors the condition of a pantograph, while a locomotive comprising the pantograph is in normal service. The invention aims further to overcome or ameliorate one or more of the disadvantages or problems described above, or at least provide the consumer with a useful choice.

DISCLOSURE OF INVENTION

According to a first embodiment of the invention, there is provided a system for evaluating the condition of a pantograph, the system comprising:

a track-side pantograph monitoring station that captures at least one image of a pantograph, while a locomotive comprising the pantograph is in normal service;

a station management system that analyses the at least one image captured at the monitoring site and determines the condition of the pantograph; and a user interface.

According to a second embodiment of the invention, there is provided a method for determining the condition of a pantograph, said method comprising the steps of detecting the presence of a locomotive at a monitoring station;

detecting the presence of a pantograph at the monitoring station;

activation of an image capture device on simultaneous detection of a locomotive and pantograph at the monitoring station, thereby capturing an image of a pantograph;

analyzing the image of the pantograph to determine whether the pantograph is damaged and/or a constituent carbon current collector is worn; and reporting the results of the analysis to an end user.

With regard to the first embodiment as defined above, the monitoring station comprises:

a data transfer means;

at least one track-side mounted sensor for detecting a locomotive as it enters the monitoring site ("locomotive sensor");

at least one track-side mounted sensor for detecting the position of the pantograph at the monitoring site ("pantograph sensor");

at least one image capture device that captures at least one image of a pantograph at the monitoring site; and a sensor interface that receives input from the sensors and commands the at least one image capture device to capture at least one image of the pantograph at the monitoring site.

The data transfer means facilitates communication between the sensors, sensor interface, at least one image capture device and the station management system. The data transfer means can be a cable such as a co-axial cable, ethernet cables, wireless connection or any other means capable of performing the requisite task.

An image capture device is preferably a high-resolution video camera but other imaging devices capable of performing the requisite task can be utilized. In a preferred embodiment, the monitoring station comprises two high-resolution video cameras, wherein the first camera is positioned such that it captures a profile image of a pantograph which comprises at least one carbon current collector and the second camera is positioned such that it captures an image of a pantograph which comprises at least one pantograph horn. Preferably, the first camera is positioned below and at an oblique angle relative to a pantograph at the monitoring site ("side-position"). Preferably, the second camera is positioned above a pantograph at the monitoring site ("top-position"). Typically, the first image capture device further comprises a backing screen. The backing screen is preferably white. It will be appreciated that the backing screen is mounted behind the focal point of the first camera and within the camera's field of view, such that when the first camera is activated the captured image is a profile of the pantograph against the backing screen. It is also preferable that the backing screen is illuminated. It will be appreciated that during the day, natural lighting is usually sufficient, while night operation requires the use of lights to illuminate the backing screen.

A sensor can be any suitable sensor; it can be an optical, ultrasonic or microwave sensor, but is preferably an infra-red sensor. In a preferred embodiment the monitoring station comprises two sensors for detecting the position of the pantograph at the monitoring site, wherein the first sensor ("top-position sensor") is positioned such that it identifies the point at which the pantograph is within the field of view of the top-position image capture device and wherein the second sensor ("side-position sensor") is positioned such that it identifies the point at which the pantograph is within the field of view of the side-position image capture device. Preferably, a sensor is in communication with an image capture device, such that when the pantograph is detected by the sensor the image capture device is activated. It will be appreciated by one of skill in the art that a pantograph monitoring system could be implemented without sensors. It will also be appreciated that such an implementation would be an inefficient use of processor time, as image capture and analysis would be performed both in the absence and presence of a locomotive at the monitoring site.

Preferably, the monitoring station further comprises at least one track-side mounted sensor for capturing locomotive identity details at the monitoring site ("locomotive identity sensor"). Typically, a locomotive identity sensor is an Automated Vehicle Identification (AVI) tag decoder. An AVI tag decoder acquires information relating to the vehicle identification number of the locomotive at the monitoring site. Other information can also be obtained from the AVI tag decoder, such as the locomotive type which can be subsequently used to filter extraneous tag information. It will also be appreciated that additional information relating to the locomotive at the monitoring site can be obtained by querying a relational database with the decoded vehicle identification number.

Preferably, the sensor interface is in the form of a circuit wherein the circuit performs the steps of:
  receiving an input from a first track-side sensor indicating that a locomotive is at the monitoring site ("locomotive sensor");
  receiving an input from a second track side sensor indicating that a pantograph is at the monitoring site ("pantograph sensor");
  de-bouncing and shaping the inputs received from the track-side sensors; and
  providing a command to an image capture device to acquire an image of the pantograph when the inputs from the locomotive sensor and pantograph sensors are received simultaneously.

Preferably, the sensor interface circuit further comprises the step of providing a command to at least one locomotive identity sensor to capture details of the locomotive at the monitoring site when the inputs from the locomotive sensor and pantograph sensors are received simultaneously.

The steps provided above are descriptive of the process performed by the sensor interface circuit on receipt of a single input emanating from a pantograph sensor. It will be appreciated that the foregoing steps can be repeated for one or more sensor inputs emanating from one or more pantograph sensors. It will also be appreciated that simultaneous receipt of inputs from both a locomotive sensor and a pantograph sensor by the sensor interface before the provision of a command to an image capture device is necessary to avoid spurious triggers from objects such as birds and insects that may be detected by a pantograph sensor.

Preferably, the station management system comprises:
  a computer; and
  a program running on the computer, wherein the program performs one or more of the following tasks:
  receiving user input from a data entry means;
  receiving at least one command from the sensor interface and directing the at least one image capture device to capture at least one image of a pantograph at the monitoring site;
  receiving locomotive details from an AVI tag reader and assigning those details to at least one image of a pantograph at the monitoring site;
  analyzing at least one image captured by the at least one image capture device for signs of damage and/or wear; and
  providing the results of the analysis to an output means.

Preferably, the program further performs at least one of the following tasks:
  controlling the illumination of the backing screen;
  calibrating the exposure and gain settings of the at least one image capture device,
  receiving input from a user, wherein the input modulates the analysis of a pantograph image; and
  automatically adjusting the exposure time and video gain of the at least one image capture device.

The program can be a multi-threaded program.

It will be appreciated that when a locomotive is detected at the monitoring site and the at least one image capture device detects that there is insufficient light to capture a suitable image of a pantograph the program automatically activates the backing screen lighting. Alternatively, the backing screen can be permanently illuminated. Preferably, the backing screen is illuminated uniformly. It will also be appreciated by one of skill in the art that this is necessary to ensure consistency between captured images. An overly long exposure time can introduce motion blur from faster moving trains, while a high gain value can result in an excessively noisy image. Furthermore, it will be appreciated that if the illumination source exhibits predictable brightness variations, such as a 100 Hz power wave fluctuation when operated from a 50 Hz AC mains power supply, it is advantageous to configure the device to use a frame rate which maximizes the difference in lighting between successive images; this minimizes the chance of taking more than one dark image in succession.

Preferably, when an image of a pantograph is captured by a side-position device the analysis for determining damage and/or wear comprises the steps of:
  receiving an input from the side-position image capture device, wherein the input represents an image of the field of view of the device;
  matching an image of a pantograph within the input image to a pre-defined model representing a known pantograph type;
  using the matched model to calculate the co-ordinates of the pantograph within the input image;
  using the co-ordinates calculated in the previous step to extract at least one image of a region of the pantograph from the input image; and analyzing the at least one image of a pantograph region to determine whether the pantograph is damaged and/or at least one carbon current collector is worn.

Preferably, a pantograph within the input image is matched to a predefined model representing either a T-bar or Y-bar pantograph configuration. As the names suggest, T-bar and Y-bar pantograph configurations are either T-shaped or Y-shape.

When an image of a pantograph is captured by a side-position image capture device the at least one image of a region representing at least one carbon current collector profile is extracted from the input image. It will be appreciated that Y-bar pantographs comprise two carbon current collectors. Preferably, when the input image is matched to a model representing a Y-bar pantograph configuration, two carbon current collector profile images are extracted from the input image. Typically, only one carbon current collector profile image is extracted from an input image matched to a model representing a T-bar pantograph. It will be appreciated by one of skill in the art that only one image can be extracted from the input image because the profile of the far current collector is obscured by the horizontal bar of the pantograph.

When an image of a region representing at least one carbon current collector profile is captured by a side-position image capture device, wear analysis preferably comprises the steps of:
- determining the distance between the surface outline representing the bottom edge of the carbon block support and the surface outline representing the top edge of the carbon block; and
- identifying regions where the distance, as measured in the preceding step, falls below a minimum acceptable distance.

When an image of a region representing at least one carbon current collector profile is captured by a side-position image capture device, damage analysis preferably comprises the steps of:
- creating a "rainfall" pattern in which the region between the bottom of the image and the surface outline representing the top edge of the carbon block is filled in with a vertical line;
- creating a closed region with a circle having a fixed radius on the surface outline representing the top edge of the carbon block; and
- subtracting the rainfall pattern from the closed region and identifying regions of damage.

Preferably, when an image of a pantograph is captured by a top-position device, the analysis for determining damage comprises the steps of:
- receiving an input from the top-position image capture device, wherein the input represents an image of the field of view of the device;
- matching an image of a pantograph within the input image to a pre-defined model representing a known pantograph type;
- using the matched model to calculate the co-ordinates of the pantograph horns within the input image;
- identifying damaged pantograph horns by comparing the horns identified in the preceding step with a pre-defined model representing a specific horn design.

It will be appreciated that a pantograph horn can take the shape of the letters V or Y or a three-pronged design consisting of a long straight bar as the central prong surrounded by shorter curved prongs. It will also be appreciated that Y-bar pantographs typically comprise horns in the shape of either the letter V or Y and T-bar pantographs typically comprise horns having a long straight bar as the central prong surrounded by shorter curved prongs.

The computer comprises a processor or microprocessor. It can be stand alone or portable. Preferably, the computer is connected to one or more computer networks. A computer network can be a local area network, wireless local area network, wide area network or Internet.

The output means can comprise one or more of the following: a visual display such as a computer monitor, a storage device such as a computer hard disk, relational database, networked device or physical output means such as paper. The output means can further comprise an electronic data transfer means for transferring data to a database run on a computer remote from the station management computer. For example, the results of the analysis can be written to image and text files on a computer hard disk; sent via e-mail and/or SMS; or written to a central database server, such as Microsoft SQL Server 2005 Express edition SP2. The results of the analysis can be stored on the station management computer or a remote computer.

The user interface comprises a data entry means and an electronic display means. The data-entry means can include keyboards and keystroke devices or voice data-entry devices. The data inputted by a user can control a task performed by the station management system or modulate the way in which the end-user views the results of the analysis.

The display means can be an electronic display device such as a computer display window. A display means can be a graphical user interface (GUI) displayed on a computer window. The GUI can be run as a program application on the station management computer or on a computer that is in communication with the station management computer. The GUI preferably provides an interface to the station management system and a relational database that serves the results of the analysis. The GUI can also modulate the way in which the end-user views the results of the analysis. The GUI can be a Windows-based application or a web-based application. The GUI preferably receives input from the data entry means.

The user interface can be located at a site remote from the track-side monitoring station and station management system. In a preferred embodiment the user interface is a display on a computer that is in communication with the track-management system and located at a remote site. In a particularly preferred embodiment, the user interface is a GUI run on a remote computer that receives input from a user and controls a task performed by the station management system and displays the results of a pantograph damage and wear analysis.

A locomotive comprising a pantograph, is in normal service if it is traversing a mainline, branch line or service line. A locomotive is not in normal service if it is located at a service depot or same or isolated from over head lines. Preferably, a locomotive is traveling at a speed no less than 12 kph when in normal service. More preferably, a locomotive is traveling at a speed no less than 12 kph and no more than 80 kph when in normal service.

In order that the invention may be more readily understood and put into practice, one or more preferred embodiments thereof will now be described, by way of example only, with reference to the accompanying drawings.

BEST MODE FOR CARRYING OUT THE INVENTION

Figure 1:
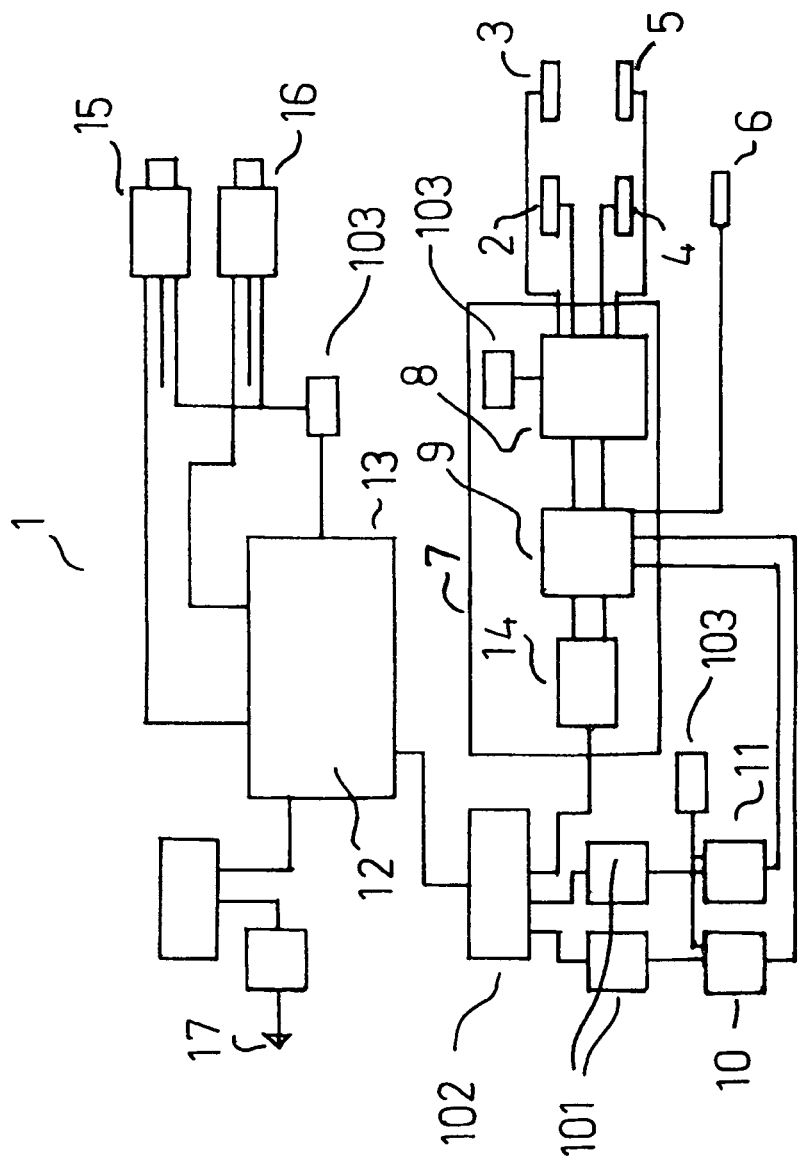
FIG. 1 is a schematic for a pantograph monitoring system.

With reference to FIG. 1, there is shown a monitoring system 1 installed at a monitoring site comprising: top position sensors 2 and 3; side position sensors 4 and 5; and locomotive sensor 6. Signals emanating from the sensors, when a pantograph is present at the monitoring station, are received by sensor interface 7. Sensor interface 7 comprises a sensor signal conditioner 8 and interface circuit 9. On simultaneous receipt of a signal indicating the presence of a locomotive at the monitoring station and a signal indicating the presence of a pantograph at the monitoring station, interface circuit 9 splits the signals into two streams. The first stream activates AVI tag readers 10 and 11, which capture the serial number of the locomotive at the monitoring site. Data received from tag readers 10 and 11 is converted to USB format via converters 101 (e.g. RS 422 to USB) and proceeds via USB hub 102 to the station management system 12, running on computer 13, where it is stored. The second stream is processed by digital I/O to USB converter 14 that is received by system 12 and in turn triggers the activation of an image capture device, item 15 or 16. Images acquired by image capture device 15 or 16 are then received by station management system 12 which analyses the acquired images to assess whether a pantograph is damaged and/or constituent carbon current collector(s) are worn. Remote access, to the results of the pantograph damage and wear analysis, is facilitated by connection 17 which connects computer 13 to a computer network. The AVI tag readers 10 and 11, sensor signal conditioner 8 and image capture devices 15 and 16 are connected to a power supply 103 (e.g. 24V DC).

It will be appreciated that a locomotive comprising a pantograph will be assessed by the monitoring system 1 when in normal service, that is, it is traversing a mainline, branch line or service line comprising a monitoring site and is typically traveling at a speed of no less than 12 kph and no more than 80 kph.

Computer 13 includes a central processing unit (CPU) which interfaces with data storage devices that are readable by machine and which tangibly embody programs of instructions that are executable by the CPU. These storage devices include RAM, ROM, and secondary storage devices, e.g. magnetic and optical disks and disk drives. One or more of the storage devices bears instructions for execution by the CPU in order to implement a method according to an embodiment of the invention. These instructions will typically have been installed from an installation disk such as an optical disk, although they may also be provided in a memory integrated circuit or via a computer network from a remote server installation. The instructions constitute a software product that when executed causes the computer system 13 to operate as a pantograph damage and/or wear detection system and in particular to implement a method that will be described later with reference to a number of flowcharts.

It will be realized by those skilled in the art that the programming of the software product is straightforward in light of the method of the present invention, a preferred embodiment of which will be described. In the following method various variables and data are manipulated. It will be realized that during operation of the computer system to implement the method, corresponding registers of the CPU will be incremented and data written to and retrieved from secondary storage and RAM by virtue of electrical signals traveling along conductive busses of the computer system. Consequently, physical effects and transformations occur within the computer system as it executes the software to implement a method according to an embodiment of the invention.

Figure 2:
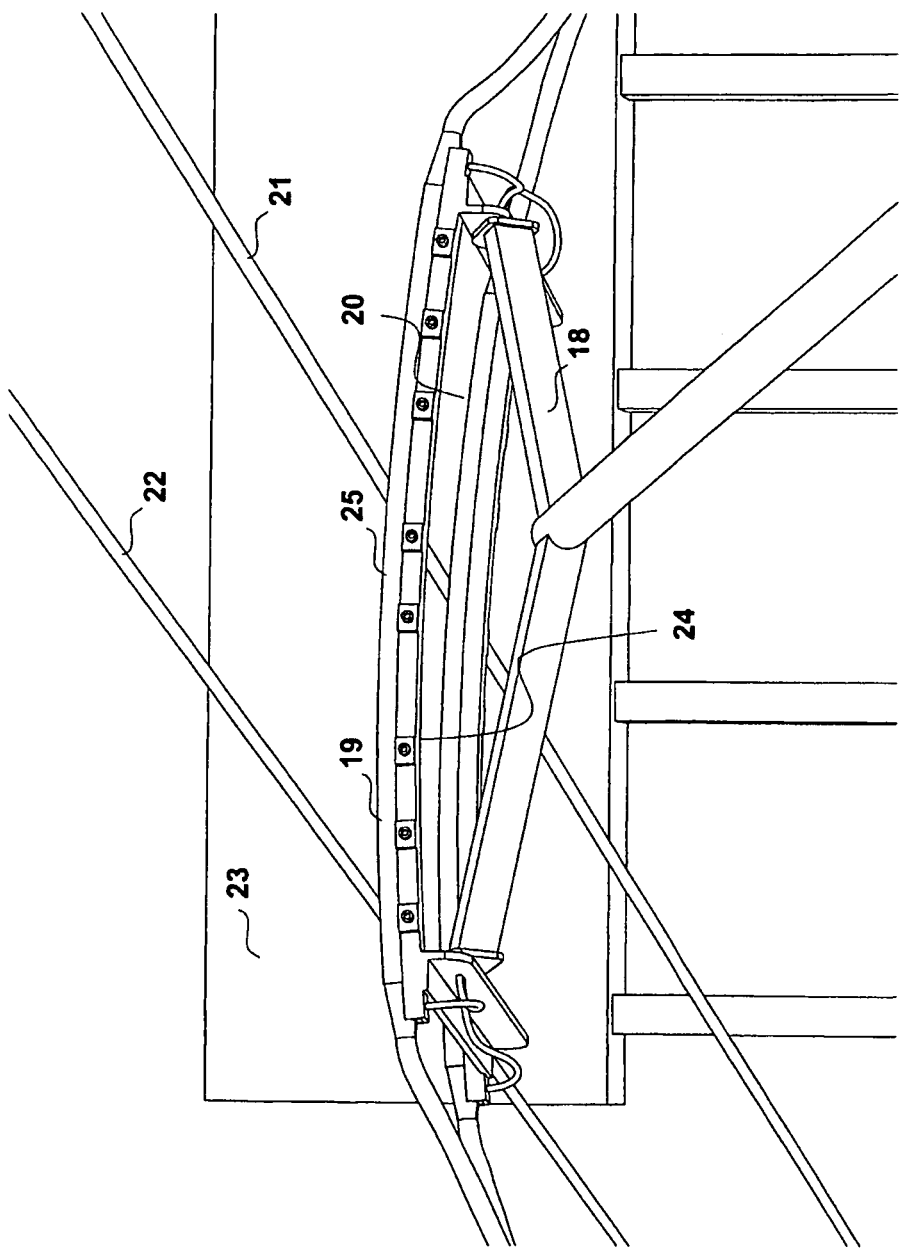
FIG. 2 is a field of view taken from a side position image capture device after activation.

With reference to FIG. 2, there is shown a field of view taken from a side position image capture device after activation. A Y-bar pantograph 18 comprising two carbon current collectors 19 and 20 in contact with overhead line 21 is shown. Catenary line 22 which is suspended above the contact wire is also shown. The current collectors are profiled against a white backing screen 23. FIG. 2 also clearly shows that each carbon current collector 19 and 20 comprises a carbon support 24 and carbon block 25.

Figure 3:
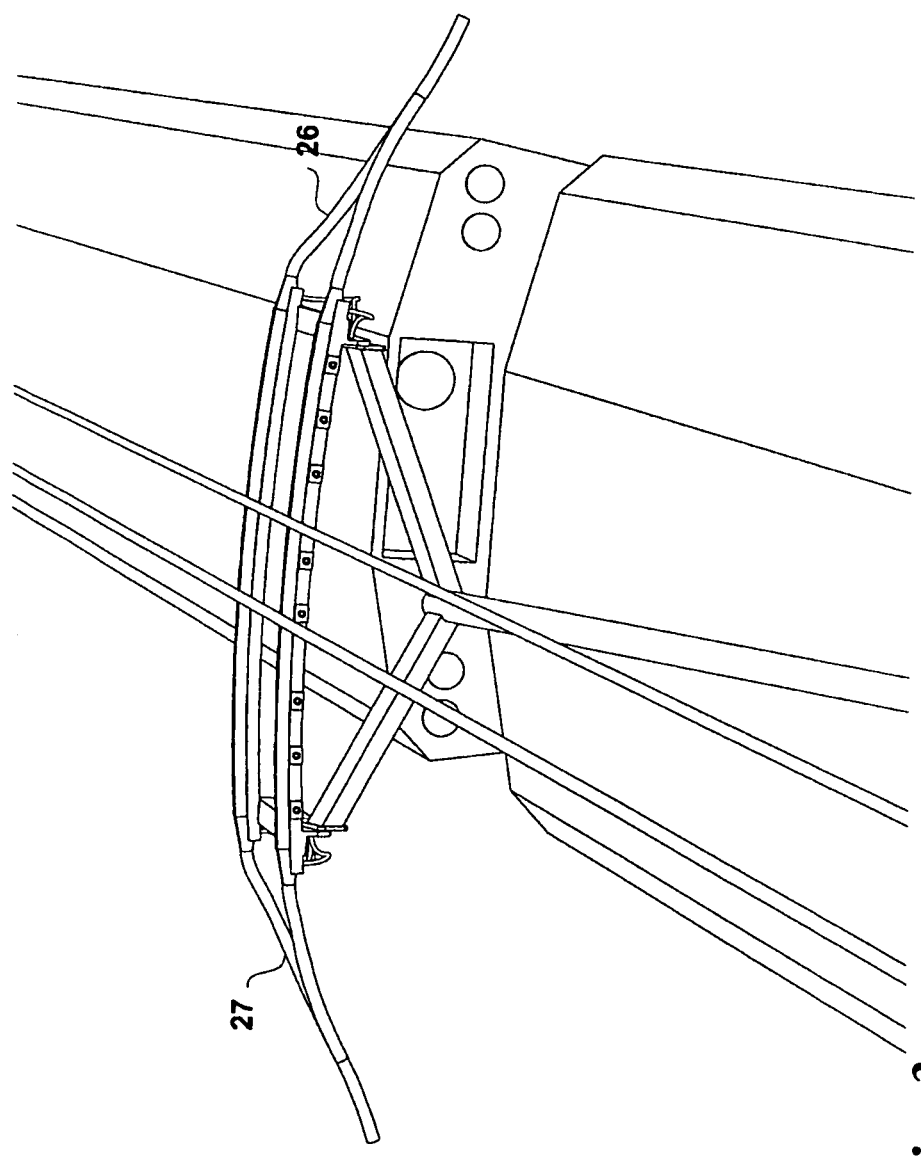
FIG. 3 is a field of view taken from a top position image capture device after activation.

With reference to FIG. 3, there is shown a field of view taken from a top position image capture device after activation. A Y-bar pantograph comprising Y-shape horns 26 and 27 is shown.

Figure 4:
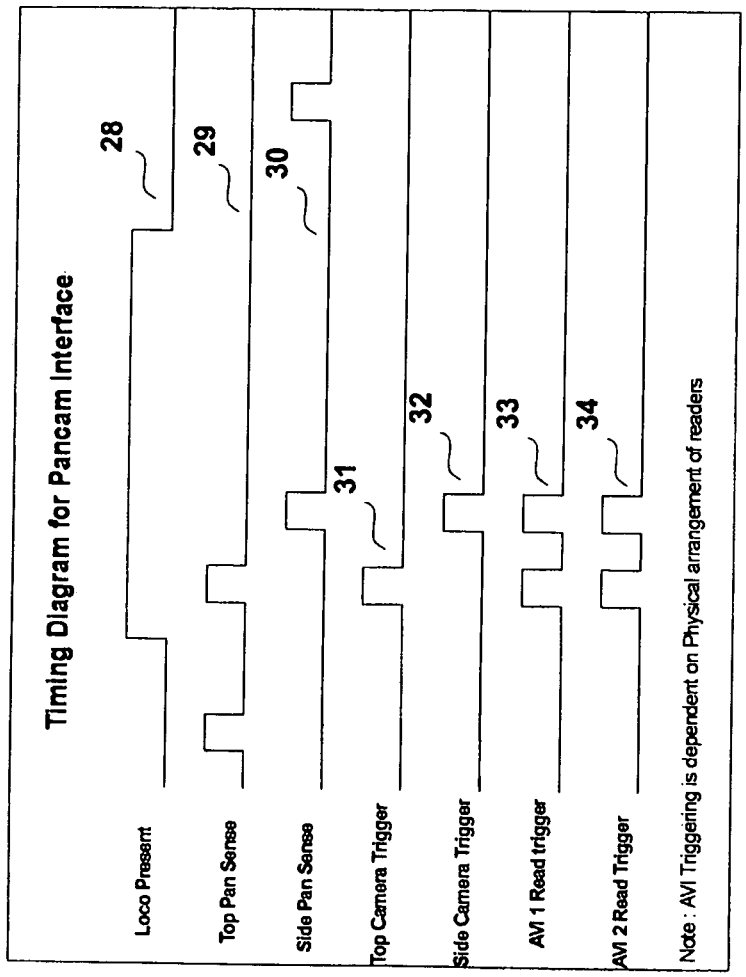
FIG. 4 is a sensor interface timing diagram.

With reference to FIG. 4, there is shown a sensor interface timing diagram depicting sensor output signals 28, 29 and 30 emanating from a locomotive sensor 6, a top-positioned pantograph sensor 2 or 3 and a side positioned pantograph sensor 4 or 5, respectively, that are received by the sensor interface 7. It will be appreciated that a line represents an output signal value as a function of time. When a locomotive, which is some 17 m long, is detected by the locomotive sensor a high output signal is received by the sensor interface over a considerable duration. When the sensor interface simultaneously receives a high output signal from the locomotive sensor 28 and a pantograph signal 29 or 30, the sensor interface 7 triggers a command signal 31 or 32 to an image capture device 15 or 16 via the station management system 11. Simultaneous receipt of a high output signal from the locomotive sensor 28 and a top or side pantograph sensor 29 or 30 triggers a command 33 or 34 to an AVI tag reader 10 or 11 to capture the locomotive serial number.

Figure 5:
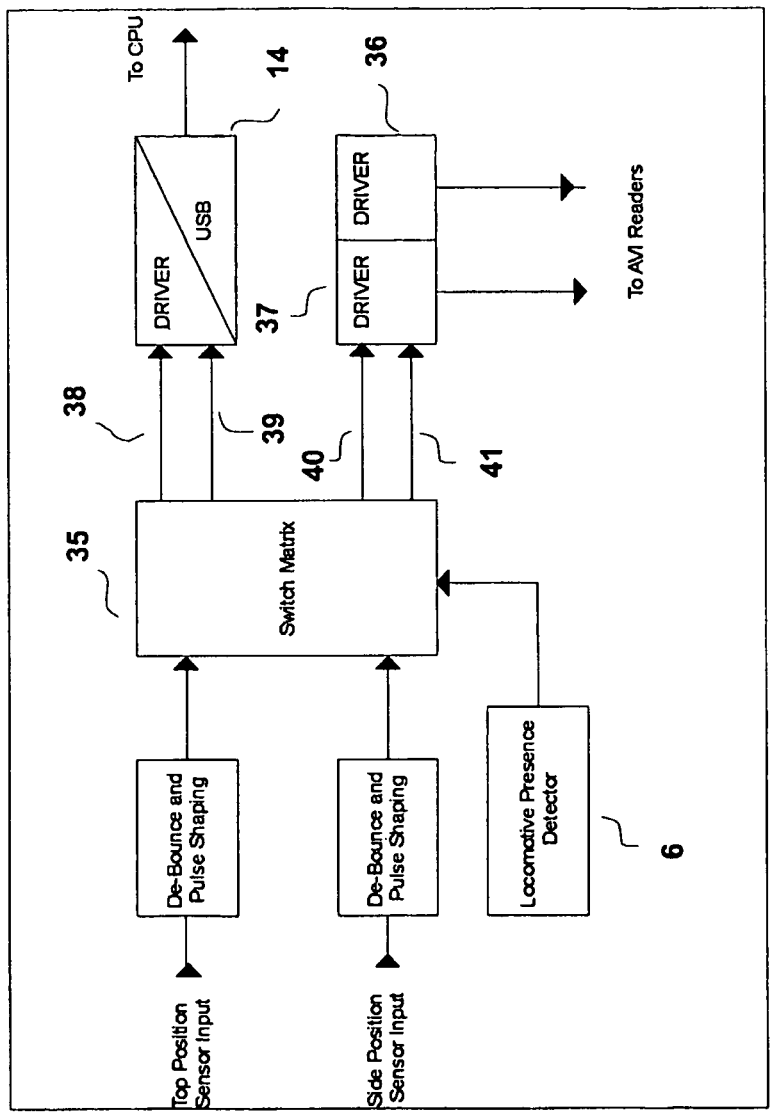
FIG. 5 is a schematic diagram depicting the sensor interface.

With reference to FIG. 5, there is shown a diagram depicting the sensor interface 7 comprising a switch matrix 35, digital I/O to USB converter 14 which is connected to a serial port of computer 13 (not shown) and drivers 36 and 37 that control AVI tag readers 9 and 10. Switch matrix 35 receives de-bounced and pulse shapes signals from pantograph sensors 2 to 5 and locomotive sensor 6. On simultaneous receipt of a high output signal from the sensors, the switch matrix provides commands 38 and 39, which are converted to a stream of ASCII characters and transferred to computer 13 via a serial port. Switch matrix 35 also provides commands 40 and 41 to AVI tag reader drivers 36 and 37.

Figure 6:
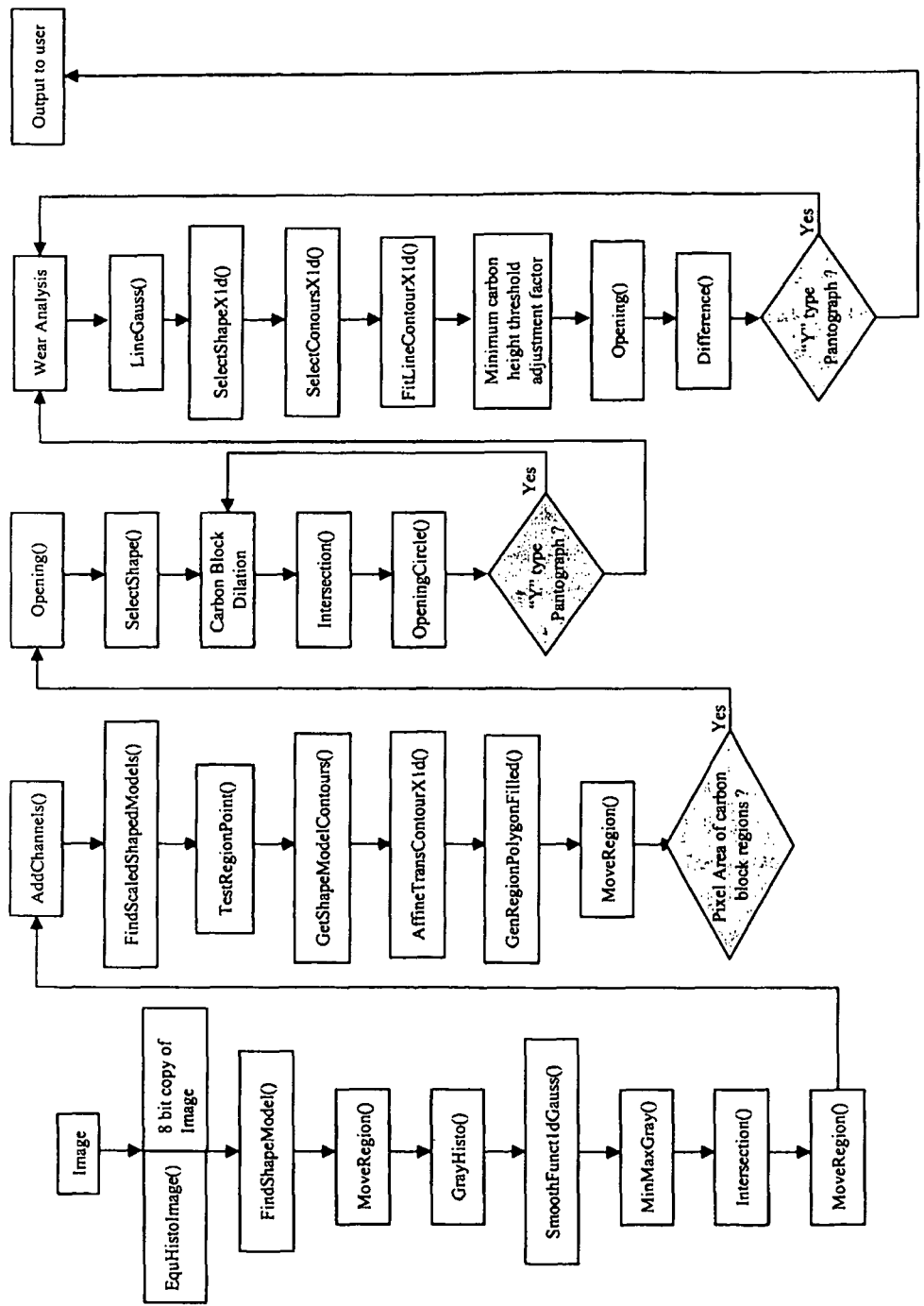
FIG. 6 is a flow diagram representing a segment of the station management program which analyses whether the carbon collector(s) of a pantograph at the monitoring site are worn.

With reference to FIG. 6, there is illustrated a flow diagram representing a segment of the station management program—referred to henceforth as PanCam—which analyses whether the carbon collectors(s) of a pantograph at the monitoring site are worn. A side view image of a pantograph at the monitoring site is captured by a high resolution video camera. The image data captured by the camera is then analyzed by the program. The program calls a number of subroutines that mutate the image data. PanCam uses the HALCON machine vision library distributed by MVTec Software GmbH to provide basic image processing tools such as morphology, line finding and pattern matching. The subroutines are typically called by PanCam in the following order:

EquHistoImage( ) modifies the input image such that the distribution of values in its intensity histogram is approximately equal among all values. PanCam uses this result as the output image, since it usually has better contrast characteristics suitable for human viewing.

CopyImage( ) is called which copies the input image, but reduces its colour depth to 8 bits (from the original 12 bits produced by the camera). This is because some HALCON operators (most notably pattern matching) only accept images with a depth of 8 bits.

The program then calls FindShapeModel( ) to match a pre-defined model of the backboard against the image. By comparing the co-ordinates of the matched model with fixed co-ordinates of where PanCam expects the backboard to be, PanCam can calculate co-ordinate offsets to adjust fixed regions-of-interest in later processing. These adjustments may be necessary due to movement in the camera viewing angle caused by maintenance work or other disturbances.

Using the background co-ordinate adjustment offsets, the program calls MoveRegion( ) to adjust the backboard region of interest. GrayHisto( ) is then called to calculate the intensity histogram over that region of interest.

At this point, the goal is to find a suitable intensity value to use as the threshold in a binary segmentation so that the pantograph profile can be extracted from the backboard. PanCam excludes a fixed percentage of the top and bottom ends of the histogram from the search to avoid incorrect selection of the minimum or maximum intensity value for use in the segmentation and then calls SmoothFunctldGauss( ) to perform Gaussian smoothing on the truncated histogram.

GetYValueFunctld( ) finds the local minima within the smoothed histogram and iteratively expands a 'window' around those points to maximize the ratio of the window width to the square of the window height, where the height is the maximum histogram bin count within the window and the width is the range of pixel values. The selected window has the widest aspect ratio of all such windows in the truncated histogram. PanCam then selects the mid-point of the window that maximizes this aspect ratio as the preliminary 8-bit segmentation threshold value.

In HALCON, histograms operators automatically map to a range of 0 to 255 for images with a colour depth greater than 8 bits. PanCam must first call MinMaxGray( ) over the image region used to generate the histogram to find the minimum and maximum values, then it can make the necessary calculations to map the preliminary 8 bit threshold to a corresponding 12 bit segmentation threshold value using a linear transformation. PanCam then uses this threshold to perform the segmentation of the pantograph profile.

Similar to step 4, PanCam adjusts the region where it can reliably examine the pantograph profile. PanCam uses HALCON to perform a region Intersection( ) on the segmented pantograph profile and the valid region-of-interest.

Again using MoveRegion( ) PanCam adjusts the search regions over which to match pantograph models. PanCam calls AddChannels( ) and FindScaledShapeModels( ) to search for multiple pantograph matches in a single operation. The match with the highest score indicates the best match and therefore the most likely identification of the pantograph type.

HALCON uses a pyramid matching algorithm where it first matches models at lower resolutions to improve the speed of the matching operation. Sometimes this results in false matches due to the reduced resolution, so PanCam calls TestRegionPoint( ) to check that the matched model does indeed lie within the fixed search region. False matches are ignored, otherwise PanCam calls GetShapeModelContours( ), AffineTransContourXld and GenRegionContourXld( ) to display the matched model on the output image.

Once PanCam has identified and located the pantograph, it calls GenRegionPolygonFilled( ) to generate regions around where it believes the carbon current collectors to be, using fixed co-ordinate offsets with the location of the pantograph model as the reference point. PanCam will also display these regions on the output image.

PanCam again uses MoveRegion( ) to adjust the predefined region representing where it believes the top edge portion of the backboard to be located in the image. If the carbon current collector regions overlap an excessive proportion of the top edge region of the backboard, then PanCam deems the carbon current collector to be in a position where analysis is unreliable and does not perform any further processing on it.

PanCam checks the pixel area of the carbon current collector regions. If the area is zero, there is no data found to process in this image: PanCam does no further processing on this image and reports "no pan". This is to cover rare situations where PanCam may completely miss the location of the pantograph and would otherwise produce incorrect diagnosis information.

Before PanCam can begin checking for damage and wear, it needs to remove interfering artifacts in the carbon current collector profile. PanCam first uses the Opening( )morphology operator to remove the profile of the overhead Wires in the image, since these intersect with the top edge of the carbon current collector profile. PanCam performs this operation over two non-overlapping regions, using a different structural element for each region to account for the changing slope of the top edge of the carbon current collector profile. In each case, PanCam also adjusts the position of the region over which it performs the opening, according to the background offset's calculated in step 4.

PanCam continues filtering the carbon current collector profile by calling SelectShape( ) to remove pieces of the profile which are far too small and remote to be considered part of the carbon current collector. Dark spots on the backboard (which can accumulate after a length of time) often cause these false profiles.

PanCam finds steps in the carbon current collector by dilating the carbon current collector profile region with a vertical line, creating a 'rainfall' effect in which everything below the top profile of the carbon current collector is filled in PanCam also performs a closing with a large circle region on the original carbon current collector profile. By subtracting the rainfall region from the closed region, any remaining regions could be indicative of 'step' damage in the carbon.

PanCam needs to limit the result region calculated in the previous step to eliminate artifacts from the rainfall operation that sometimes leave unrecognisable shapes near the horns of the pantograph. PanCam once again adjusts fixed regions-of-interest according to the background offsets and then call Intersection( ) on the valid region and the result of the previous step.

In the final part of damage analysis, PanCam calls OpeningCircle( ) with a small radius to remove tiny artifacts from the result of the previous step. Then, if any discrete region in the result has an area greater than a fixed threshold value, PanCam deems the carbon current collector to have possible step damage present. In this case, PanCam also displays the result on the output image by dilating the damage regions and printing the outlines (to leave the highlighted damage unobscured).

Steps 16 to 18 are repeated for the second carbon current collector, if the pantograph is 'Y' type. It will be appreciated that only one carbon current collector profile image is extracted from an input image matched to a model representing a T-bar pantograph, because the profile of the far current collector is obscured by the horizontal bar in the pantograph.

For wear analysis, PanCam takes a carbon current collector profile that has already been processed to remove overhead wires and other artifacts. If there is more than one discrete region in this profile, PanCam discards the profile and moves on to the second carbon current collector.

PanCam must decide how much the carbon current collector is affected by perspective scaling since the pantograph may be in different positions relative to the camera in different images. PanCam uses the LinesGauss( ) line finding operator to locate the overhead power cable. PanCam then calls SelectShapeXld( ) to only select reasonably straight lines (contrast with curved lines or arcs) and SelectContoursXld( ) to select lines running in the same direction as it expects of the overhead wire. PanCam then calls FitLineContourXld( ) to calculate the straight-line formula of the remaining lines (using the Tukey approach) and takes the intersection point between the result and the top edge of the carbon current collector. PanCam uses this intersection point as the reference point for perspective scaling adjustment.

Using the reference point calculated in the previous step, PanCam applies the column ordinate to a fixed, pre-determined formula to calculate an adjustment factor to the minimum carbon height threshold. Carbon current collectors closer to the camera would result in a greater carbon height threshold than carbon current collectors further from the camera, corresponding with perspective scaling of the pantograph as it approaches the camera.

Once PanCam has determined the minimum accepted height, it uses the Opening( ) operator with a vertical line of that height as the structural element. PanCam then calls Difference( ) to subtract the result of the opening from the original carbon current collector profile. Any region remaining is indicative of possible excessive carbon wear and PanCam will flag a carbon current collector as worn if the width of that remaining image region is sufficiently large. In this case, PanCam also highlights the worn region on the output image by dilating the region and displaying its outline.

Steps 20 to 23 are repeated for the second carbon current collector, if the pantograph is 'Y' type. It will be appreciated that steps 20 to 23 are not repeated if the pantograph in the input image is matched to a model representing a T-bar pantograph. This is because the profile of the far current collector is obscured by the horizontal bar in the pantograph.

Figure 7:
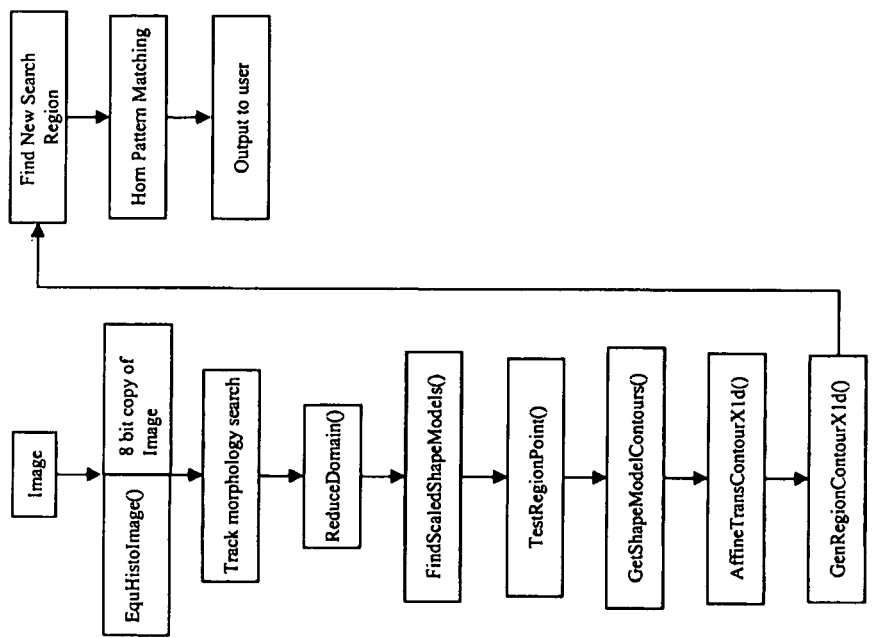
FIG. 7 is a flow diagram representing a segment of the station management program that determines whether the constituent horn(s) of a pantograph at the monitoring site are damaged.

With reference to FIG. 7, there is illustrated a flow diagram representing a program that determines whether the constituent horn(s) of a pantograph at the monitoring site are damaged. A perspective top-view image of a pantograph at the monitoring site is captured by a high resolution video camera. The image data acquired by the camera is then analysed by the program. The program calls a number of subroutines that mutate the image data. The subroutines are typically called by the program in the following order:

EquHistoImage( ) modifies the input image such that the distribution of values in its intensity histogram is approximately equal among all values. PanCam uses this result as the output image, since it usually has better contrast characteristics suitable for human viewing.

CopyImage( ) is called which copies the input image, but reduces its colour depth to 8 bits—from the original 12 bits produced by the camera. This is because some HALCON operators (most notably pattern matching) only accept images with a depth of 8 bits.

Before searching for a pantograph, PanCam first tries to match a pre-defined rail track model against the image. If HALCON can successfully find a set of tracks in the image, then PanCam assumes that there is no locomotive actually in the image, since a locomotive would otherwise obscure the view of the tracks. In this case, PanCam rejects the current image and moves on to the next one for processing.

PanCam calls ReduceDomain( ) to reduce the search region to a predefined region where pantograph matches are expected within the image. It then calls FindScaledShapeModels( ) to match against multiple pre-defined pantograph models. As with pattern matching in side-view processing, PanCam must check for false matches using the TestRegionPoint( ) operator—if the check fails, the pantograph match is rejected as being too far outside the expected pantograph region. PanCam uses the scale factor returned from the pattern match as a scale factor for offsets in subsequent matching operations to accommodate perspective scaling.

After locating and identifying the pantograph, PanCam (as with side-view pattern matching) uses GetShapeModelContours( ) AffineTransContourXld( ) and GenRegionContourXld( ) to display the matched model on the output image.

PanCam uses the co-ordinates of the matched pantograph and a set of pre-defined co-ordinate offsets (scaled by the scale factor determined in step 4) to calculate new search regions left and right of the pantograph over which to search for horns. PanCam then performs more pattern matching operations, one for each side, to check for the presence or absence of horns.

For Y-Bar pantographs, the matching operation uses a single model for the horn. However, for T-Bar pantographs, where the horns consist of three separate prongs, PanCam first looks for the long, central horn part. Assuming a successful pattern match, PanCam then generates two more search regions, calculated from the location of the horn part and a set of scaled pre-defined co-ordinate offsets. PanCam then performs yet another pattern match operation to check the presence or absence of the remaining two horn parts.

If the pattern matcher fails to find a horn or horn part at any stage in the previous step, PanCam declares the horn as damaged. In all cases where HALCON successfully matches a horn or horn part, PanCam display the matched model on the output image.

Figure 8:
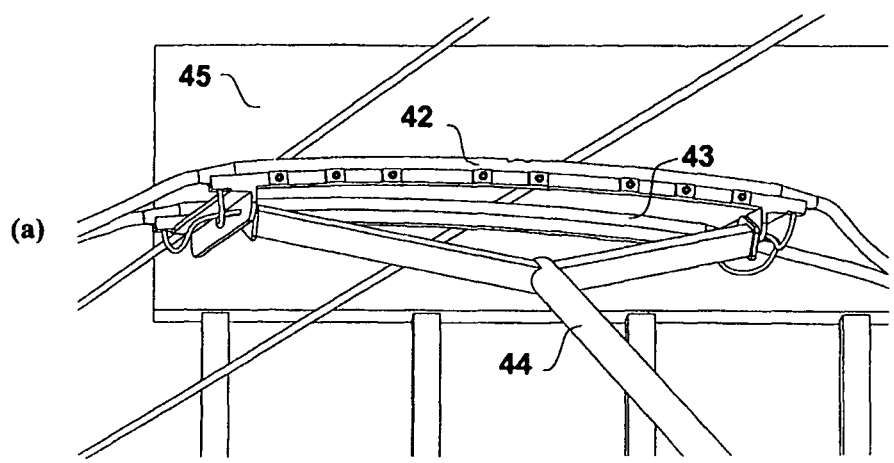
FIG. 8 shows the results of an analysis in which wear and damage to a carbon current collector has been detected.
Figure 8:
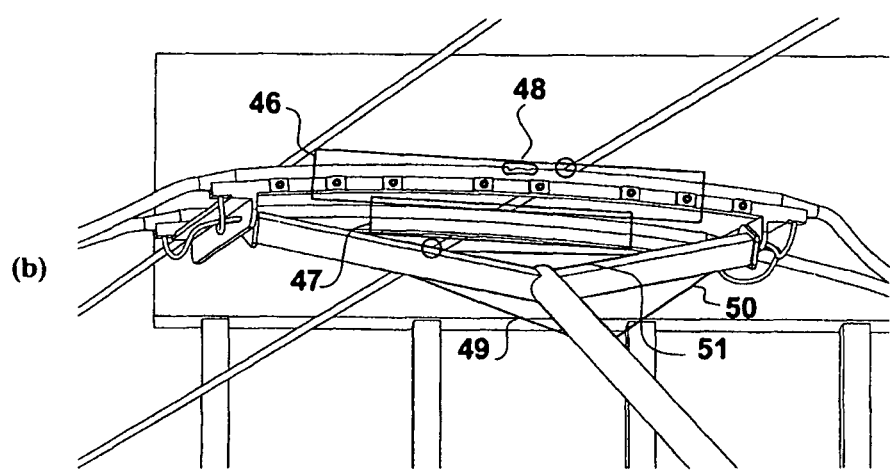

With reference to FIG. 8a, there is shown a field of view taken from a side-view image capture device in which the profile of a pair of carbon current collectors 42 and 43 of a Y-bar type pantograph 44 are profiled against a backing screen 45. FIG. 8b is a composite image showing the results of a wear and damage analysis superimposed on the image described above. Yellow outlines 46 and 47 highlight those regions of each carbon current collector profile that has been analyzed for wear. Red outline 48 highlights a region of possible "step" damage. Cyan outlines 49, 50 and 51 show the results of the pantograph model match. FIG. 8c shows the results of the analysis.

Figure 9:
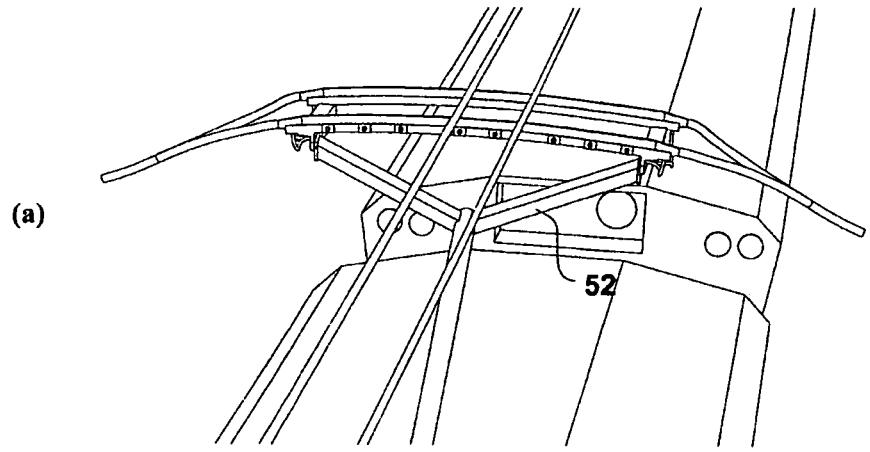
FIG. 9 shows the results of an analysis in which damage to a pantograph horn has been detected.
Figure 9:
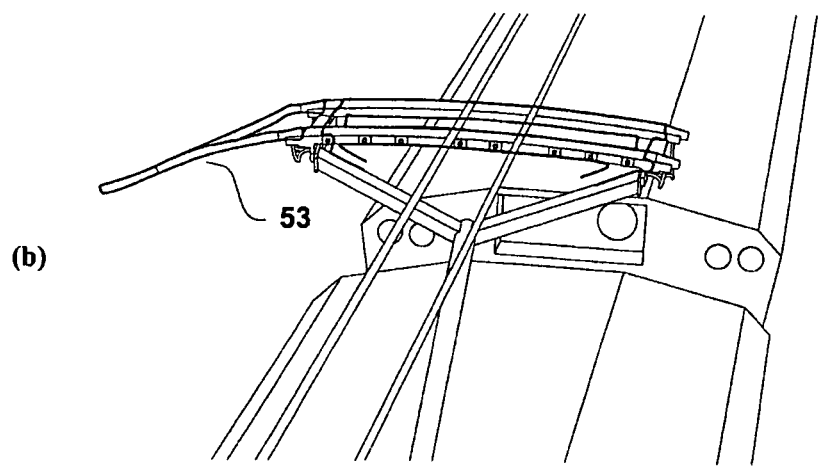

With reference to FIG. 9a, there is shown a field of view taken from a top-view image capture device in which a Y-bar type pantograph 52 is shown. In FIG. 9b there is shown a field of view taken from a top-view image capture device in which a Y-bar type pantograph 52 is missing a constituent horn 53. FIG. 9c shows the results of a horn damage analysis as presented by a graphical user interface.

Figure 10:
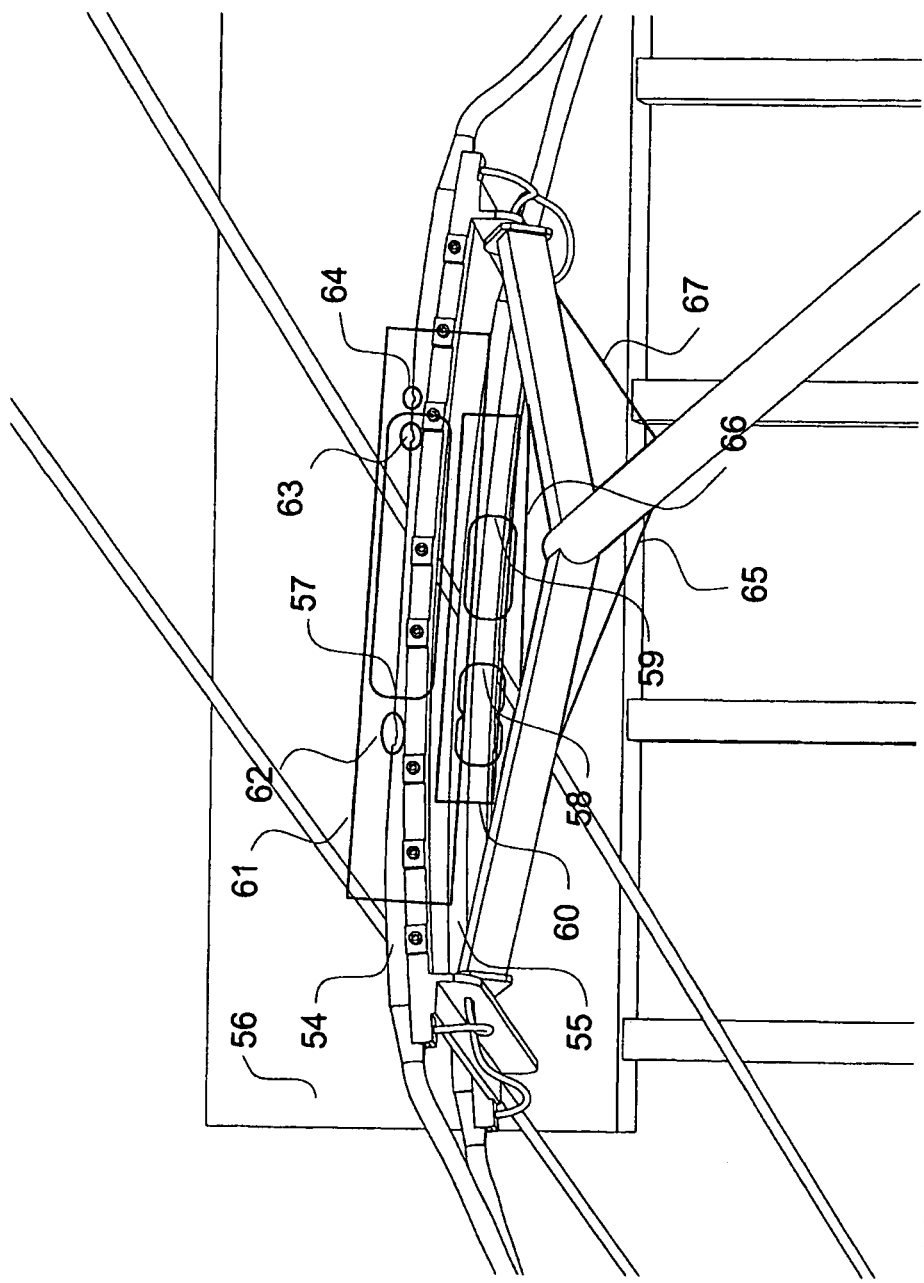
FIG. 10 shows the results of an analysis in which damage and wear to a carbon current collector has been detected.

With reference to FIG. 10 there is shown a field of view taken from a side-view image capture device in which the profile of a pair of carbon current collectors 54 and 55 of a Y-bar type pantograph are profiled against a backing screen 56. The results of a damage analysis are superimposed on the image. Blue outlines 57, 58 and 59 enclose regions of excessive wear. Yellow outlines 60 and 61 highlight those regions of each carbon current collector profile that has been analyzed for wear. Red outlines 62, 63 and 64 highlight regions of possible "step" damage. Cyan outlines 65, 66 and 67 show the results of the pantograph model match.

The operation of a particularly preferred system according to the invention is described in the following paragraphs:

The PanCam program 12 implements a multi-threaded approach. The PanCam program includes a thread to handle signals from the locomotive and pantograph sensors. On receiving a signal from the sensors it adds the sensor input to a queue for processing by an image capture thread. The image capture thread in turn triggers the appropriate camera 15 or 16 to take an image, as determined by information provided by the USB I/O device 14. When the image has been captured, the image capture thread adds the image it has just captured to a queue of images waiting to be processed.

At the same time, AVI tag readers 10 and 11 placed on either side of the track receive locomotive identification information. The tag readers send the information to the computer 13 running PanCam. The information is transmitted as a stream of ASCII characters through a serial port, which the PanCam software stores in a buffer containing the most recently received tags.

The image processing thread removes images one at a time from the image processing queue and analyses them. The image processing thread associates each image with the vehicle identification tag which time of receipt most closely matches the time of image capture. If there are no ID tags with a time-stamp within two-and-a-half minutes of the image capture (a window of five minutes), then PanCam processes the image without an associated ID tag.

The image processing thread analyses the image for signs of damage or wear on the carbon current collector or for damaged or missing horns on the pantograph depending upon the position of the image capture device that produced the image. After the analysis is complete, PanCam displays visual and text-based results on screen as well as writing information to image and text files on disk. If the diagnosis result indicates possible damage or wear, and the user has configured PanCam to do so, then PanCam sends an alert via e-mail and/or SMS to the end user. The image processing thread adds e-mail messages to an e-mail queue, and PanCam processes them in a separate e-mail sending thread.

In addition to the e-mail reporting, PanCam may also record results to a central database server via a standard ODBC interface. The central server uses Microsoft SQL Server 2005 Express Edition SP2 as the database. On the same server computer, an Apache web server is set up together with PHP 5 to allow for web access to the database. Engineers can then examine the results of an analysis via the web interface and make the necessary investigations and repairs on locomotives, as well as record in the database results which they have already considered.

To ensure continued operation of PanCam in its unsupervised environment, the PanCam program has an internal monitor thread which regularly checks the responsiveness of each of its other threads. Should any of these threads become unresponsive for an extended period, PanCam restarts the computer. Additionally, the PanCam program is itself monitored by an external service which starts PanCam automatically and can restart the computer running PanCam if it detects that the PanCam software is not running or is unresponsive.

The system account used to ensure desktop interactivity has no access to network resources. This is a mechanism of the Microsoft Windows system and cannot be changed. To allow the copying of images and data files from the computer running PanCam to the central database server, a second service runs together with the PanCam program to perform the file copying on its behalf. This copying service runs under a user account which has permissions allowing it to write to the web server file system.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to publications cited in this specification is not an admission that the disclosures constitute common general knowledge.

The invention claimed is:

1. A system for evaluating the condition of a pantograph, the system comprising:
    a track-side pantograph monitoring station for capturing an image of the pantograph while a locomotive comprising the pantograph is in normal service, the monitoring station comprising a first image capture device positioned below and at an oblique angle relative to the pantograph;
    a station management system for analyzing the image captured at the monitoring station and for determining the condition of the pantograph, the station management system configured to:
    a) determine a number of current collectors in the pantograph by matching the image to a pre-defined model of a plurality of pre-defined models, the plurality of pre-defined models representing a plurality of known pantograph types;
    b) generate a current collector profile for each of the number of current collectors and based upon the image; and
    c) analyse each of the current collector profiles to determine the condition of the pantograph; and
    a user interface for controlling the station management system and indicating whether the pantograph is damaged and/or worn.

2. The system of claim 1, wherein the monitoring station comprises:
    a data transfer means;
    at least one track-side mounted sensor for detecting a locomotive as it enters the monitoring station ("locomotive sensor");
    at least one track-side mounted sensor for detecting the position of the pantograph at the monitoring station ("pantograph sensor");
    at least one image capture device that captures at least one image of the pantograph at the monitoring station; and a sensor interface that receives input from the sensors and commands the at least one image capture device to capture at least one image of the pantograph at the monitoring station.

3. The system of claim 2, wherein the data transfer means facilitates communication between the sensors, sensor interface, at least one image capture device and the station management system.

4. The system of claim 3, wherein the monitoring station further comprises a second image capture device for capturing an image of the pantograph which comprises at least one pantograph horn.

5. The system of claim 4, wherein the first image capture device ("sideposition image capture device") is configured to capture a profile image of the pantograph which comprises at least one carbon current collector.

6. The system of claim 5, wherein the second image capture device ("top-position image capture device") is positioned above the pantograph at the monitoring station.

7. The system of claim 6, wherein an image capture device is a high-definition video camera.

8. The system of claim 7, wherein the first image capture device further comprises a backing screen.

9. The system of claim 8, wherein the backing screen is white.

10. The system of claim 9, wherein the backing screen is illuminated.

11. The system of claim 10, wherein the backing screen is mounted behind the focal point of the image capture device and within the device's field of view, such that when the first image capture device is activated the captured image is a profile of the pantograph against the backing screen.

12. The system of claim 11, wherein the locomotive sensor and/or the pantograph sensor is an infra-red sensor.

13. The system of claim 12,
wherein the pantograph sensor is a top-position pantograph sensor positioned such that it identifies the point at which the pantograph is within the field of view of the top-position image capture device, and
wherein the monitoring station comprises a further pantograph sensor for detecting the position of the pantograph, the further pantograph sensor being a side-position pantograph sensor positioned such that it identifies the point at which the pantograph is within the field of view of the side-position image capture device.

14. The system of claim 13, wherein at least one of the sensors is in communication with the at least one of the image capture device, such that when the pantograph is detected by the sensor the at least one image capture device is activated.

15. The system of claim 14, wherein the monitoring station further comprises at least one track-side mounted sensor for capturing locomotive identity details ("locomotive identity sensor").

16. The system of claim 15, wherein the at least one locomotive identity sensor is an Automated Vehicle Identification (AVI) tag decoder.

17. The system of claim 16, wherein the AVI tag decoder acquires information relating to any one of: the vehicle identification number of the locomotive at the monitoring station; or a locomotive type.

18. The system of claim 17, wherein the sensor interface is in the form of a circuit wherein the circuit performs the steps of:
receiving an input from the locomotive sensor indicating that the locomotive is at the monitoring station;
receiving an input from at least one of the pantograph sensors indicating that the pantograph is within the field of view of one of the image capture devices;
de-bouncing and shaping the inputs received from the sensors; and
providing a command to at least one of the image capture devices to acquire an image of the pantograph when the inputs from the locomotive sensor and pantograph sensors are received simultaneously.

19. The system of claim 18, wherein the sensor interface circuit performs the further step of providing a command to the at least one locomotive identity sensor to capture details of the locomotive at the monitoring station when the inputs from the locomotive sensor and pantograph sensors are received simultaneously.

20. A method of analyzing whether a pantograph is damaged and/or worn using computer programs, the method comprising the steps of:
receiving at least one command from a sensor and on receipt of the at least one command activating at least one image capture device to capture an image of the pantograph at a monitoring station, said at least one image capture device being positioned below and at an oblique angle relative to the pantograph;
analyzing the image captured by the at least one image capture device for signs of damage and/or wear, wherein the analyzing includes:
a) determining a number of current collectors in the pantograph by matching the image to a predefined model of a plurality of pre-defined models, the plurality of pre-defined models representing a plurality of known pantograph types, b) generating a current collector profile for each of the number of current collectors and based upon the image; and c) analysing each of the current collector profiles to determine the condition of the pantograph; and
providing the results of the analysis to an output means.

21. The method of claim 20, wherein the method further performs at least one of the following steps:
receiving user input;
receiving locomotive details from an AVI tag reader and assigning those details to the image of the pantograph;
controlling the illumination of a backing screen, wherein the backing screen is mounted behind the focal point of the at least one image capture device;
calibrating the exposure and gain settings of the at least one image capture device;
receiving input from a user, wherein the input modulates the analysis of the image of the pantograph; and
automatically adjusting the exposure time and video gain of the at least one image capture device.

22. The method of claim 21, wherein the analysis of the image of the pantograph captured by the at least one image capture device comprises the steps of:
receiving an input from the at least one image capture device, wherein the input represents an image of the field of view of the device;
using the matched pre-defined model to calculate the co-ordinates of the pantograph within the input image;
using the co-ordinates calculated in the previous step to extract at least one image of a region of the pantograph from the input image; and
analyzing the at least one image of the pantograph region to determine whether the pantograph is damaged and/or worn.

23. The method of claim 22, wherein a region representing one carbon current collector profile is extracted from the input image.

24. The method of claim 22, wherein a region representing two carbon current collector profile images are extracted from the input image.

25. The method of claim 23 or 24, wherein the analysis of carbon current collector wear comprises the steps of:
   determining a distance between a surface outline representing a bottom edge of a carbon current collector and a surface outline representing a top edge of the carbon current collector; and
   identifying regions where the distance, as measured in the preceding step, falls below a minimum acceptable distance that is indicative of wear.

26. The method of claim 25, wherein the analysis of carbon current collector damage comprises the steps of:
   creating a "rainfall" pattern in which a region between a bottom of the image and a surface outline representing a top edge of the carbon current collector is filled in with a vertical line;
   creating a closed region with a circle having a fixed radius on the surface outline representing the top edge of the carbon current collector; and
   subtracting the rainfall pattern from the closed region and identifying regions of damage.

27. The method of claim 26, wherein the analysis further comprises the steps of:
   receiving an input from the at least one image capture device, wherein the input represents an image of the field of view of the device;
   matching an image of the pantograph within the input image to the pre-defined model representing a known pantograph type;
   using the matched pre-defined model to calculate the co-ordinates of the pantograph horn within the input image;
   identifying a damaged or missing pantograph horn by comparing the co-ordinates identified in the preceding step with a further pre-defined model representing a specific horn design.

28. The method of claim 27, wherein the pre-defined model is either a Tbar or Y-bar pantograph configuration.

29. The method of claim 28, wherein the computer is connected to one or more computer networks.

30. The method of claim 29, wherein the output means comprises one or more of the following: a visual display such as a computer monitor, a storage device such as a computer hard disk, relational database, networked device or physical output means such as paper.

31. The method of claim 30, wherein the output means can further comprise an electronic data transfer means for transferring data to a database run on a computer remote from the station management computer.

32. The method of claim 31, further comprising a user interface, the user interface comprising a data entry means and an electronic display means.

33. The system of claim 32, wherein the data entry means controls a task performed by the station management system or modulates the way in which the end-user views the results of the analysis.

34. The method of claim 33, wherein the user interface is a display on a computer that is in communication with the station management system and is located at a remote site.

35. The method of claim 34, wherein a locomotive is traveling at a speed no less than 12 kph and no more than 80 kph when in normal service.

36. An automated method for determining the condition of a pantograph, said method comprising the steps of:
   detecting the presence of a locomotive at a monitoring station;
   detecting the presence of the pantograph at the monitoring station;
   activation of an image capture device on simultaneous detection of the locomotive and pantograph at the monitoring station to thereby capture an image of the pantograph, the image capture device being positioned below and at an oblique angle relative to the pantograph;
   analyzing the image of the pantograph to determine whether the pantograph is damaged and/or a constituent carbon current collector is worn, wherein the analyzing includes a) determining a number of current collectors in the pantograph by matching the image to a pre-defined model of a plurality of pre-defined models, the plurality of pre-defined models representing a plurality of known pantograph types; b) generating a current collector profile for each of the number of current collectors and based upon the image; and c) analysing each of the current collector profiles to determine the condition of the pantograph; and
   reporting the results of the analysis to an end user.

37. A system for evaluating the condition of a pantograph, the system comprising:
   a track-side pantograph monitoring station for capturing an image of the pantograph while a locomotive comprising the pantograph is in normal service, the monitoring station comprising a first image capture device positioned below and at an oblique angle relative to the pantograph;
   a sensor interface for receiving a first input from a locomotive sensor indicating that the locomotive is at the monitoring station, receiving a second input from a pantograph sensor indicating that the pantograph is within the field of view of the first image capture device, de-bouncing and shaping the inputs received from the sensors; and providing a command to the first image capture device to acquire an image of the pantograph when the first and second inputs are received simultaneously;
   a station management system for analyzing the image captured at the monitoring station and for determining the condition of the pantograph, wherein the analyzing includes a) determining a number of current collectors in the pantograph by matching the image to a pre-defined model of a plurality of pre-defined models, the plurality of pre-defined models representing a plurality of known pantograph types; b) generating a current collector profile for each of the number of current collectors and based upon the image; and c) analysing each of the current collector profiles to determine the condition of the pantograph is performed according to the matched pre-defined model; and
   a user interface for controlling the station management system and indicating whether the pantograph is damaged and/or worn.

38. The system of claim 37, wherein the sensor interface circuit is configured to provide a command to a locomotive identity sensor to capture locomotive identity details of the locomotive at the monitoring station when the first and second inputs are received simultaneously.

* * * * *